United States Patent
Aarabi et al.

(10) Patent No.: US 12,505,761 B2
(45) Date of Patent: Dec. 23, 2025

(54) MAMMALIAN THERMAL MANIKIN

(71) Applicant: University of Washington, Seattle, WA (US)

(72) Inventors: Shahram Aarabi, Seattle, WA (US); Jason Germany, Seattle, WA (US); Abhijith Shasheendra, Seattle, WA (US); Ketan Sunil Mhetre, Seattle, WA (US)

(73) Assignee: University of Washington, Seattle, WA (US)

( * ) Notice: Subject to any disclaimer, the term of this patent is extended or adjusted under 35 U.S.C. 154(b) by 503 days.

(21) Appl. No.: 18/167,629

(22) Filed: Feb. 10, 2023

(65) Prior Publication Data

US 2023/0252913 A1    Aug. 10, 2023

Related U.S. Application Data

(60) Provisional application No. 63/308,875, filed on Feb. 10, 2022.

(51) Int. Cl.
*G09B 23/34* (2006.01)
*G01K 7/02* (2021.01)
(Continued)

(52) U.S. Cl.
CPC ............ *G09B 23/34* (2013.01); *G01K 7/021* (2013.01); *G01K 13/10* (2013.01); *G01N 25/32* (2013.01); *G01K 2213/00* (2013.01)

(58) Field of Classification Search
CPC ........ G09B 23/34; G01K 7/021; G01K 13/10; G01K 2213/00; G01N 25/32
See application file for complete search history.

(56) References Cited

U.S. PATENT DOCUMENTS

| 6,544,041 B1* | 4/2003 | Damadian | G09B 23/285 600/416 |
| 2007/0054254 A1* | 3/2007 | Cook | G09B 23/28 434/262 |

(Continued)

OTHER PUBLICATIONS

Ayers, F., et al., "Fabrication and characterization of silicone-based tissue phantoms with tunable optical properties in the visible and near infrared domain," Proceedings of SPIE BiOS, 2008, San Jose, California, Feb. 21, 2008, Proc. SPIE 6870, Design and Performance Validation of Phantoms Used in Conjunction with Optical Measurements of Tissue, pp. 1-9.

(Continued)

*Primary Examiner* — Omkar A Deodhar
(74) *Attorney, Agent, or Firm* — Christensen O'Connor Johnson Kindness PLLC

(57) ABSTRACT

A thermally representative phantom mammalian manikin assembly is provided. The assembly can include a cover portion representative of mammalian tissue partially enclosing a thermal cavity having a thermally representative material therein. The cover portion can have an opening with a cap extending across the opening and configured to further enclose the thermal cavity. The cap can have an aperture extending therethrough to receive a device extending through the aperture and into the thermally representative material within the thermal cavity. The device can be a thermocouple configured to measure a temperature of the thermally representative material. In assemblies representing mammalian limbs, the assembly can further include a second thermal cavity representing an additional portion of the limb, e.g., thermally representative upper and lower leg cavities.

21 Claims, 3 Drawing Sheets

(51) Int. Cl.
*G01K 13/10* (2006.01)
*G01N 25/32* (2006.01)

(56) References Cited

U.S. PATENT DOCUMENTS

| | | | | |
|---|---|---|---|---|
| 2007/0166670 | A1* | 7/2007 | Sakezles | G09B 23/28 |
| | | | | 434/274 |
| 2010/0099067 | A1* | 4/2010 | Agro' | G09B 23/34 |
| | | | | 434/272 |
| 2013/0177890 | A1* | 7/2013 | Sakezles | G09B 23/30 |
| | | | | 434/274 |
| 2013/0192741 | A1* | 8/2013 | Trotta | B29C 39/021 |
| | | | | 264/294 |

OTHER PUBLICATIONS

"Ballistic Dummy Gel Leg," Ballistic Dummy Lab © 2023, Simi Valley Calif., <https://ballisticdummylab.com/collections/ballistic-hands/products/ballistic-gel-leg> [retrieved May 24, 2023], 5 page brochure.

Bibb, R., et al., "Medical Modeling: The Application of Advanced Design and Rapid Prototyping Techniques in Medicine," Elsevier Science & Technology, Boston, pp. 1-6, 2015.

Cheung, C.L., and N.R. Saber, "Application of 3D printing in medical simulation and education," Bioengineering for Surgery: The Critical Engineer Surgeon Interface, Elsevier, pp. 151-166, 2016.

Chung, P., et al., "Rapid and low-cost prototyping of medical devices using 3D printed molds for liquid injection molding," Journal of Visualized Experiments (2014) pp. 1-16, 2014.

Dabbagh, A., et al., "Tissue-mimicking gel phantoms for thermal therapy studies," Ultrasonic Imaging 36(4):291-316, 2014.

Etheridge, M.L., et al., "Methods for Characterizing Convective Cryoprobe Heat Transfer in Ultrasound Gel Phantoms," Journal of Biomechanical Engineering 135:1-10, 2013.

Kashif, A., et al., "Silicone breast phantoms for elastographic imaging evaluation," Medical Physics 40(6):1-11, 2013.

Mhetre, K.S., et al., "Prototyping a Thermal Limb: Methods for Building a Thermally Representative Phantom Limb," J. Kalra, et al. (Eds.): AHFE 2021, LNNS 263, pp. 253-260, 2021.

Mowlavi, A., et al., "Local hypothermia during early reperfusion protects skeletal muscle from ischemia-reperfusion injury," Plastic and Reconstructive Surgery 111(1):242-250, 2003.

Kuppa, S., et al., "Lower Extremity Response and Trauma Assessment Using the THOR-Lx/HIIIr and the Denton Leg in Frontal Offset Vehicle Crashes," National Highway Traffic Safety Administration, Paper 456, Jun. 4, 2001, 12 pages.

Trupiano, M., et al., "Using thermoelectric cooling with tourniquets for nerve preservation," Proceedings of the ASME 2016 Heat Transfer Summer Conference, Washington, D.C., Jul. 10-14, 2016, HT2016-7236, 9 pages.

Walters, T.J., and R.L. Mabry, "Issues related to the use of tourniquets on the battlefield," Military Medicine 170:770-775, 2005.

Commean, P.K., et al., "Design of a 3-D surface scanner for lower limb prosthetics: A technical note," Journal of Rehabilitation Research and Development 33(3):267-278, 1996.

* cited by examiner

MAMMALIAN THERMAL MANIKIN

CROSS-REFERENCE TO RELATED APPLICATION

This application claims the benefit of Provisional Application No. 63/308,875, filed Feb. 10, 2022, the disclosure of which is hereby incorporated by reference herein in its entirety for all purposes.

STATEMENT OF GOVERNMENT LICENSE RIGHTS

This invention was made with Government support under Contract No. W81XWH-17-1-0693 awarded by the Department of Defense. The Government has certain rights in the invention.

BACKGROUND

During development of medical devices, one aspect of testing is simulating the environment in which the medical device is intended to be used. Human/mammalian testing may not be an option while the device is in development, particularly in the early stages. As such, a testing protocol that mimics the human/mammalian body is necessary to advance the production of the device. Phantom units can replicate some properties of interest in the human/mammalian body for medical device testing, such that the device's performance can be quantified and improved in subsequent iterations.

Conventional mammalian phantom units are used for testing based on their structural or optical similarity to the human/mammalian body (e.g., ultrasound phantom units), but these conventional units are unable to accurately replicate thermal properties of human/mammalian tissue. When developing a medical device that includes an aspect of heat transfer into human/mammalian tissue, the conventional phantom units cannot provide testing data to track the thermal performance of the device.

In one example, a limb cooling tourniquet device in intended to mitigate the side effects that are caused by using a tourniquet on a human limb. Compromised blood flow to a part of the body for an extended time period can cause acute limb ischemia, which deprives the limb of oxygen, leading to nerve damage. The limb cooling tourniquet device can slow or stop progression of acute limb ischemia by cooling the human limb to a relatively low temperature (about 10° C.) while the tourniquet is used. The limb cooling tourniquet device can include components configured to cool the human limb having the tourniquet without causing skin damage (e.g., frostbite). Thermal performance testing of the limb cooling tourniquet device with respect to its effect on human tissue is not possible with conventional phantom units.

SUMMARY

The present disclosure provides examples of a thermally representative phantom mammalian manikin assembly. As will be described in more detail below, the thermally representative phantom mammalian manikin assembly can mimic the thermal performance of a human/mammalian limb, extremity, joint, torso, and/or head.

In accordance with an aspect of the present disclosure, a thermally representative phantom mammalian manikin assembly is provided. In an embodiment, the thermally representative phantom mammalian manikin assembly includes a cover portion partially enclosing a thermal cavity, the cover portion having an opening; a cap extending across the opening and configured to further enclose the thermal cavity, the cap having an aperture extending therethrough; a thermally representative material configured to represent mammalian tissue and positioned within the thermal cavity; and a device extending through the aperture and into the thermally representative material within the thermal cavity. In some embodiments, the device can be configured to measure a property of the thermally representative material.

In accordance with another aspect of the present disclosure, a thermally representative phantom mammalian manikin leg limb assembly is provided. In an embodiment, the thermally representative phantom mammalian manikin leg limb assembly includes an upper cover portion partially enclosing an upper thermal cavity having a first thermally representative material therein, the upper cover portion having a first upper opening; a first upper cap extending across the first upper opening and configured to further enclose the upper thermal cavity, the first upper cap having a first upper aperture extending therethrough; a first device extending through the first upper aperture and into the upper thermally representative material. The assembly further includes a mid cover portion operably coupled to the upper cover portion; a lower cover portion operably coupled to the mid cover portion opposite the upper cover portion, the lower cover portion partially enclosing a lower thermal cavity having a second thermally representative material therein, the lower cover portion having a first lower opening; a first lower cap extending across the first lower opening and configured to further enclose the lower thermal cavity, the first lower cap having a first lower aperture extending therethrough; and a second device extending through the first lower aperture and into the second thermally representative material. The first device can be configured to measure a property of the first thermally representative material, and the second device can be configured to measure a property of the second thermally representative material.

In accordance with another aspect of the present disclosure, a method of thermally testing a mammalian heat transfer device is provided. The method includes obtaining a thermally representative phantom mammalian manikin assembly, comprising: a cover portion at least partially enclosing a thermal cavity and having an aperture extending therethrough; a thermally representative material configured to represent mammalian tissue and positioned within the thermal cavity; and a thermocouple extending through the aperture and into the thermally representative material within the thermal cavity, wherein the thermocouple is configured to measure a temperature of a portion of the thermally representative material. The method can further include changing the thermal energy of the thermally representative phantom mammalian manikin assembly; and measuring the change in temperature of the portion of the thermally representative material.

In any of the embodiments of the present disclosure, the device can be a thermocouple configured to measure temperature of the thermally representative material.

In any of the embodiments of the present disclosure, the assembly can further include a second cap extending across the second opening of the cover portion and configured to further enclose the thermal cavity.

In any of the embodiments of the present disclosure, the assembly can further include a structural member extending between the first cap and the second cap, wherein the structural member can be configured to arrange the first and second caps at a fixed distance apart.

In any of the embodiments of the present disclosure, the thermally representative material can be an ultrasound gel.

In any of the embodiments of the present disclosure, the cover portion can be formed from a material comprising a mixture of silicone and graphite.

In any of the embodiments of the present disclosure, the mixture can have a ratio of about 95% Shore 25A silicone elastomer and a ratio of about 5% graphite.

In any of the embodiments of the present disclosure, the cover portion can be an upper cover portion and the assembly can further include a lower cover portion partially enclosing a second thermal cavity having the thermally representative material therein, the lower cover portion having a lower cover opening; a mid cover portion operably coupled between and separating the upper cover portion and the lower cover portion; a second cap extending across the lower cover opening and configured to further enclose the second thermal cavity, the second cap having a second aperture extending therethrough; and a second device extending through the second aperture and into the thermally representative material within the second thermal cavity. The second device can be configured to measure a property of the thermally representative material within the second thermal cavity.

In any of the embodiments of the present disclosure, the first and second devices can be thermocouples, the property of the first thermally representative material can be a first temperature, and the property of the second thermally representative material can be a second temperature.

In any of the embodiments of the present disclosure, the upper cover portion can further include a second upper opening and the assembly further comprises a second upper cap extending across the second upper opening configured to further enclose the upper thermal cavity; and the lower cover portion can further include a second lower opening and the assembly further comprises a second lower cap extending across the second lower opening configured to further enclose the lower thermal cavity.

In any of the embodiments of the present disclosure, the assembly can further include a third device extending through a second upper aperture of the second upper cap and into the first thermally representative material within the upper thermal cavity, the third device being configured to measure a second property of the first thermally representative material; and the assembly can further include a fourth device extending through a second lower aperture of the second lower cap and into the second thermally representative material within the lower thermal cavity, the fourth device being configured to measure a second property of the second thermally representative material.

In any of the embodiments of the present disclosure, the third and fourth devices can be thermocouples configured to measure temperatures of the first and second thermally representative materials, respectively.

In any of the embodiments of the present disclosure, the assembly can further include a first structural member extending between the first upper cap and the second upper cap, wherein the first structural member can be configured to arrange the first and second upper caps at a fixed distance apart; and a second structural member extending between the first lower cap and the second lower cap, wherein the second structural member can be configured to arrange the first and second lower caps at a fixed distance apart.

In any of the embodiments of the present disclosure, the first and second thermally representative materials can be formed from an ultrasound gel.

In any of the embodiments of the present disclosure, the ultrasound gel can have a specific gravity of 1.02.

In any of the embodiments of the present disclosure, the upper cover portion and the lower cover portion can be formed from a material having a mixture comprising a ratio of about 95% Shore 25A silicone elastomer and a ratio of about 5% graphite.

In any of the embodiments of the present disclosure, the mid cover portion can arrange the upper cover portion and the lower cover portion at a fixed distance apart.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

Figure 1:
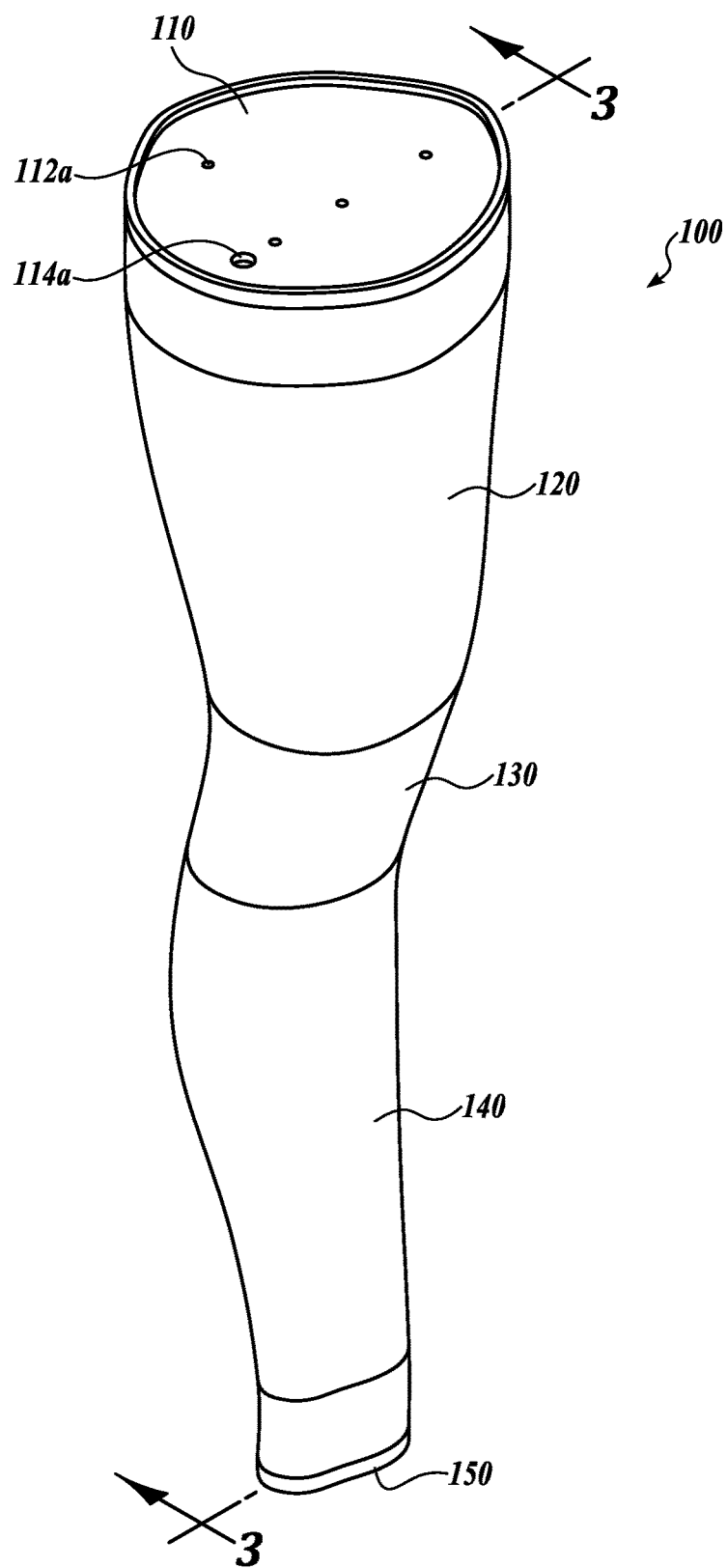
FIG. 1 is a perspective view of an embodiment of a thermally representative phantom leg limb assembly formed in accordance with aspects of the present disclosure.

The detailed description set forth above in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed.

As will be described in more detail below, the present disclosure provides examples of thermally representative phantom manikin components (e.g., limbs, fingers, toes, joints, torso, head, etc.) that are capable of mimicking thermal reactive properties of mammalian tissue for, e.g., testing medical devices. Developing a medical device having a component of heat transfer between human/mammalian tissue (energy transfer into or out of the tissue) requires testing the thermal performance of the device and/or determining device settings that will not cause damage to the tissue of the user. For example, when testing a limb cooling tourniquet device for slowing or stopping progression of acute limb ischemia by cooling the mammalian limb, the measured properties (e.g., internal temperature, rate of change of temperature, etc.) of the thermally representative phantom manikin component can provide data related to the performance of the product and the likelihood that the product will be safe for use on humans/mammals. Once the thermal performance and safety testing is complete, the medical device can more safely be used in the human or animal trial phase. The foregoing medical device development use case is only intended as an illustrative example of an application of the thermally representative phantom manikin components. As such, the components of the present disclosure may also be suitable for use cases such as to instrument a phantom body fitted with heat resistant garments used by firefighters, in a ballistic dummy used for testing the effects of certain weapons, or in a crash test dummy to monitor passenger safety in the event of an automobile fire, among other suitable uses. These and other use case example described herein should not be considered limiting to the scope of the present disclosure.

Although embodiments of the present disclosure may be described with reference to a configuration of a thermally representative phantom mammalian manikin component generally illustrative of a human leg, as shown in the FIGURES, one skilled in the relevant art will appreciate that the disclosed embodiments are illustrative in nature and therefore should not be construed as limited to such an application. It should therefore be apparent that the disclosed technologies and methodologies have wide application, and therefore may be suitable for use with many types of thermally representative phantom components, including any human/mammalian body part, such as limbs, fingers, toes, joints, torso, head, and the like. Accordingly, the following descriptions and illustrations herein should not limit the scope of the claimed subject matter.

FIG. 1 is a perspective view of an embodiment of a thermally representative phantom leg limb assembly 100 ("phantom leg 100") formed in accordance with aspects of the present disclosure. The phantom leg 100 is illustrated as a representative human leg both spatially and thermally such that a medical device can interact with the phantom leg 100 during development. In this regard, as will be described below, areas of the phantom leg 100 where temperature data is desired can be filled with a thermally representative material (denoted "TRM" herein, see FIG. 3) having thermal properties mimicking those of human/mammalian tissue (skin, muscles, fat, etc.) blood, and other soft materials. In this regard, the thermal performance of the TRM may not mimic skeletal components. As the medical device transfers thermal energy into or out of the phantom leg 100, thermocouples positioned within the TRM and/or the covers representative of skin/muscle tissue can provide data related to temperature, rate of change in temperature, etc. for development of the medical device. The TRM can be any suitable material having the desired thermal performance properties. In some embodiments, the TRM comprises ultrasound gel; however, the TRM can alternatively comprise any suitable liquid, paste, gel (e.g., ballistic gel), mixture, solution, plastic, rubber, epoxy, etc.

The phantom leg 100 can include an upper end cap 110 positioned at a proximal end of the phantom leg 100, and upper leg cover portion 120, a mid-leg cover portion 130, a lower leg cover portion 140, and a lower end cap 150 positioned at a distal end of the phantom leg 100. As will be described below with reference to FIGS. 2 and 3, the upper and lower end caps 110 and 150 can include openings for, e.g., inserting thermocouples (such as through a first thermocouple aperture 112a positioned in the upper end cap 110), filling cavities with material (such through a first filling aperture 114a positioned in the upper end cap 110), inserting other tools and probes, etc. Although the FIGURES and description herein are related to a human/mammalian leg limb assembly, other embodiments of the phantom assemblies can include other human/mammalian limbs (e.g., arms or arm portions, feet), extremities (e.g., fingers, toes), joints (knee, elbow), the torso, and/or the head, including combinations thereof, each of which are also within the scope of the present disclosure.

Figure 2:
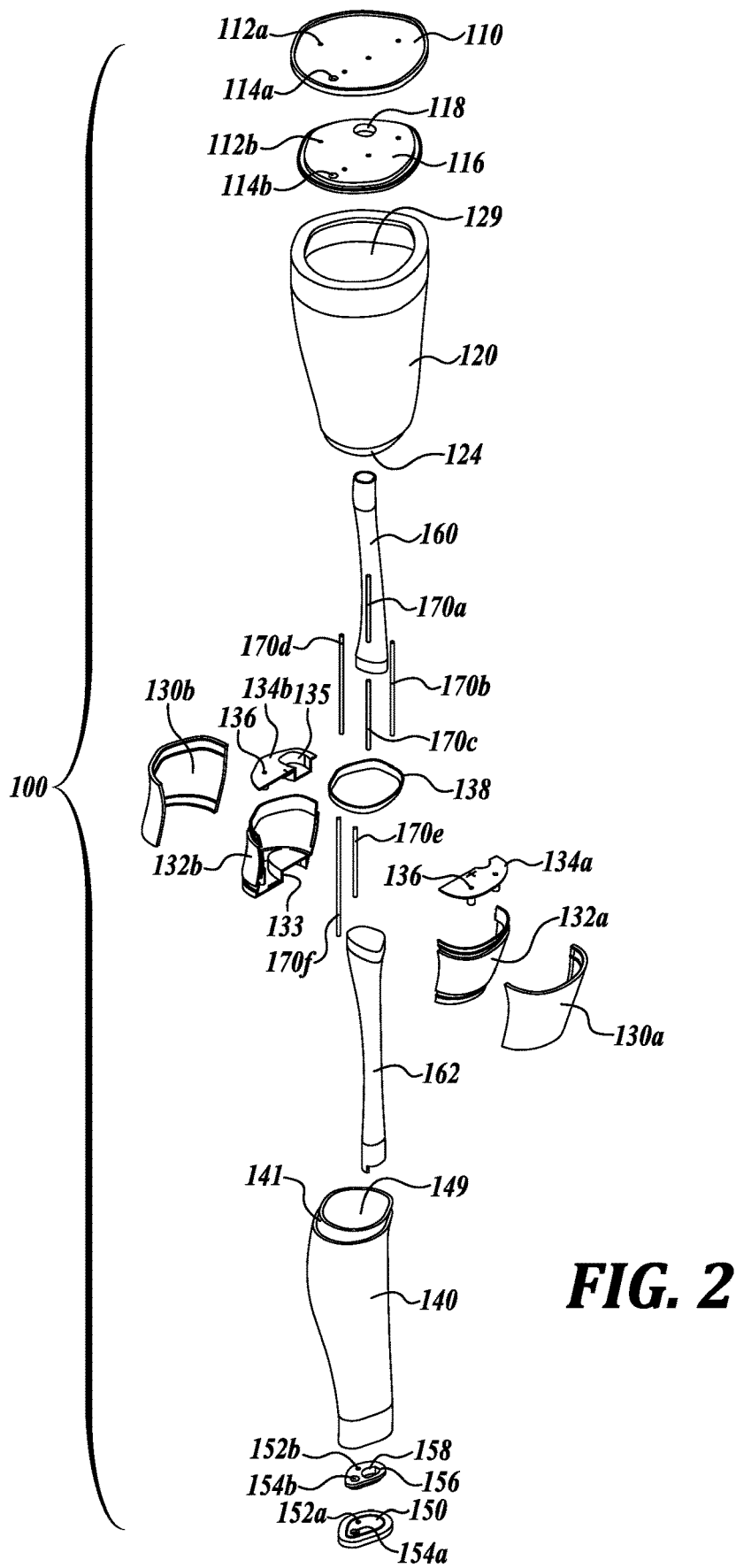
FIG. 2 is an exploded perspective view of the thermally representative phantom leg limb assembly of FIG. 1.
Figure 3:
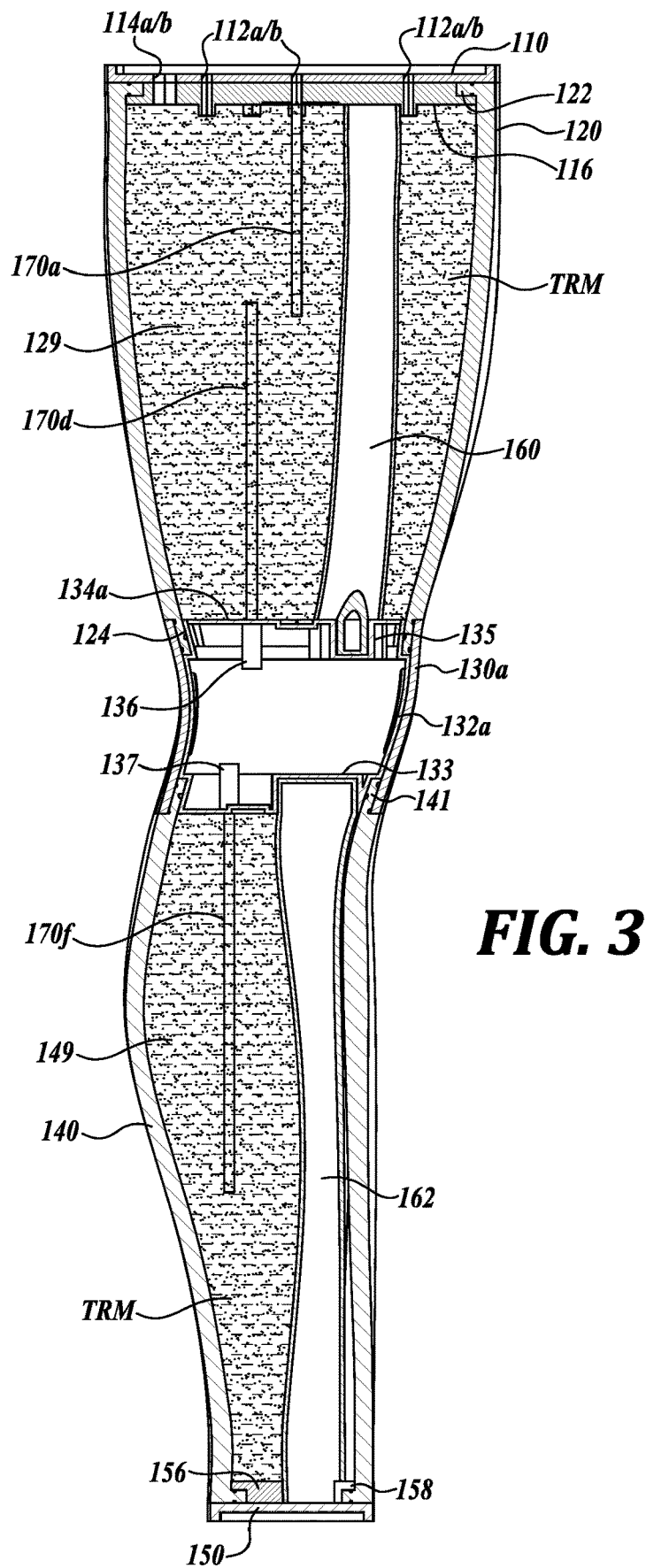
FIG. 3 is a cross sectional side view of the thermally representative phantom leg limb assembly of FIG. 1.

FIG. 2 is a cross sectional side view and FIG. 3 is an exploded perspective view of the phantom leg 100 configured in accordance with embodiments of the present disclosure. The upper end cap 110 can include one or more apertures 112a configured to receive a device, e.g., a thermocouple, to permit extension of the device through the upper end cap 110 and into the TRM. The TRM is generally shown in FIG. 3 as being enclosed within an upper leg cavity 129 surrounded by the upper leg cover portion 120 (e.g., the thigh portion), the upper end cap 110, and the mid-leg portion (described below). In some embodiments, the TRM can also be enclosed in a lower leg cavity 149 surrounded by the lower leg cover portion 140 (e.g., the calf portion), the mid-leg portion, and the lower end cap 150. In other embodiments, the TRM can be contained within any portion of the phantom leg 100 to permit thermal data collection in these areas. The phantom leg 100 may further include an inner upper end cap 116 having apertures 112b corresponding to and axially aligning with the apertures 112a and a second filling aperture 114b corresponding to and axially aligning with the first filling aperture 114a, each of the upper end cap 110. In this regard, as the inner upper end cap 116 is operably coupled to the upper end cap 110 (e.g., with fasteners, not shown), the apertures 112a and 112b can be axially aligned to permit insertion of a thermocouple therethrough, and the apertures 114a and 114b can be axially aligned to permit filling of the upper leg cavity 129, e.g., with TRM. Although not shown, after filling a cap or plug can be inserted within the apertures 114a and 114b to prevent escape of the TRM from the upper leg cavity 129.

As shown in FIG. 3, the upper leg cover portion 120 can include a coupling flange 122 at the proximal end of the upper leg cover portion 120. The operable coupling of the upper end cap 110 to the inner upper end cap 116 can clamp the coupling flange 122 between the upper end cap 110 and the inner upper end cap 116, creating a seal between the end caps 110 and 116 and the upper leg cover portion 120 to contain the TRM in the upper leg cavity 129.

A plurality of thermocouples 170 can be extended through the apertures 112a and 112b of the upper end caps 110 and 116 and into the TRM within the upper leg cavity 129. Although the phantom leg 100 is shown with thermocouples 170a, 170b, 170c, and 170d each contained within the upper leg cavity 129 at different positions (with thermocouples 170e and 170f contained within the lower leg cavity 149 at different positions), including any number of thermocouples is within the scope of the present disclosure such that the temperature within the phantom leg 100 can be measured for various medical device testing. Likewise, the thermocouples 170a, 170b, 170c, 170d, 170e, and 170f are shown with different orientations (e.g., top-down, bottom-up, etc.), but are suitably arranged in any orientation, angle, and/or pattern to obtain the desired thermal data of the phantom leg 100.

The distal end of the upper leg cover portion 120 can interface with the mid-leg cover portion 130 at a lower flange 124 of the upper leg cover portion 120. The mid-leg cover portion 130 can be configured as a transition area between the upper leg cover portion 120 and the lower leg cover portion 140. In some embodiments, the interface between the upper leg cover portion 120 at the lower flange 124 and the mid-leg cover portion 130 can have one or more sealing members to prevent escape of the TRM from the upper leg cavity 129, and/or ingress of contaminants. The lower end of the upper leg cavity 129 can be enclosed by an upper mid-leg cap 134 configured to interface with the upper leg cover portion 120 to seal the upper leg cavity 129. In some embodiments, the upper mid-leg cap 134 can include a first portion 134a and a second portion 134b, which can be joined together to aid in assembly of the phantom leg 100. Similar to the caps 110 and 116, the upper mid-leg cap 134 can include an aperture 136 configured to receive a device (e.g., a thermocouple) therethrough.

Rigid structure can be included in the upper leg portion of the phantom leg 100 by spanning an upper structural member 160 ("upper bone" 160) between the upper end caps 110 and 116 and the upper mid-leg cap 134. In some embodiments, the upper leg cover portion 120 can be formed from a flexible material, e.g., silicone-graphite, rubber, etc. In this regard, the upper bone 160 can provide structure to prevent collapse of the upper leg cover portion 120 during testing of the phantom leg 100. The proximal end of the upper bone 160 can be constrained by a first bone aperture 118 in the inner upper end cap 116, and the distal end of the upper bone 160 can be constrained by a second bone aperture 135 in the upper mid-leg cap 134. In an example, during assembly of the phantom leg 100, the upper bone 160 can be captured between the first bone aperture 118 and the second bone aperture 135 such that the upper bone 160 provides a structural connection between the upper end caps 110 and 116 and the upper mid-leg cap 134, supporting the upper leg portion of the phantom leg 100. Although a single upper bone 160 is shown in the FIGURES, any number of structural members is within the scope of the present disclosure.

In the illustrated embodiment, the cavity within the mid-leg cover portion 130 is not filled with the TRM or any devices/thermocouples. As such, the mid-leg cover portion 130 can be configured as a transition and coupling between the upper leg cover portion 120 and the lower leg cover portion 140. In some embodiments, the mid-leg cover portion 130 can include a first mid-leg cover portion 130a and a second mid-leg cover portion 130b configured to be attached together during assembly of the phantom leg 100. The phantom leg 100 can further include inner mid-leg cover portions 132a and 132b, generally corresponding to the mid-leg cover portions 130a and 130b, respectively. During assembly, the inner mid-leg cover portions 132a and 132b can operably abut the mid-leg cover portions 130a and 130b and clamp, e.g., the lower flange 124 of the upper leg cover portion 120, sealing the TRM within the upper leg cavity 129. A locking ring 138 can be included below the upper mid-leg cap 134 to fix the upper mid-leg cap 134 against the upper bone 160 and the TRM within the upper leg cavity 129.

The phantom leg 100 can further include lower leg components that are similar in function to the upper leg components described above. In this regard, the lower leg cover portion 140 can include an upper flange 141 that is configured to be clamped between the inner mid-leg cover portions 132a and 132b and the mid-leg cover portions 130a and 130b during assembly, sealing the TRM within the lower leg cavity 149. The inner mid-leg cover portion 132a can include one or more apertures 137 (see FIG. 3) to receive a thermocouple (e.g., the thermocouple 170f) therethrough. The inner mid-leg cover portion 132a can include a third bone aperture 133 configured to receive the proximal end of a lower structural member 162 ("lower bone" 162) to provide structure to the lower leg portion of the phantom leg 100.

At the distal end, the phantom leg 100 can include the lower end cap 150 having one or more apertures 152a configured to receive a device therethrough, e.g., a thermocouple, and a filling aperture 154a to permit filling the lower leg cavity 149 with the TRM. An inner lower end cap 156 can include corresponding apertures 152b and 154b and can be configured to operably couple to the lower end cap 150 to axially align the apertures 152a with 152b and 154a with 154b, and additionally to clamp a flange 158 of the lower leg cover portion 140. Additionally, the inner lower end cap 156 can include a fourth bone aperture 158 configured to receive the distal end of the lower bone 162 to capture the lower bone 162 between the inner mid-leg cover portion 132a and the inner lower end cap 156.

In some embodiments, the upper and lower bones 160 and 162 are formed from any suitable material to provide structure to the respective portions of the phantom leg 100, e.g., acrylonitrile butadiene styrene (ABS), plastic, metal, etc. The material of the upper and lower leg cover portions 120 and 140 can be configured to represent the thermal properties of skin and muscle tissue of a human/mammalian limb, while the TRM balances the heat holding capacity of the phantom leg 100. In some embodiments, the TRM is ultrasound gel with a specific gravity of 1.02. In some embodiments, the material of the upper and lower leg cover portions 120 and 140 can be a mixture of Shore 25A silicone elastomer (95%)+graphite (5%). In other embodiments, the mixture can include any Shore A hardness (e.g., Shore 25A-80A inclusive) of the silicone elastomer. Fasteners are generally omitted from the FIGURES and description for clarity, e.g., fasteners that operably couple the upper end caps 110 and 116, etc.

In the foregoing description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B." Similarly, the phrase "at least one of A, B, and C," for example, means (A), (B), (C), (A and B), (A and C), (B and C), or (A, B, and C), including all further possible permutations when greater than three elements are listed.

It should be noted that for purposes of this disclosure, terminology such as "upper," "lower," "vertical," "horizontal," "fore," "aft," "inner," "outer," "front," "rear," etc., should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. A thermally representative phantom mammalian manikin assembly, comprising:
    a cover portion partially enclosing a thermal cavity, the cover portion having an opening;
    a cap extending across the opening and configured to further enclose the thermal cavity, the cap having an aperture extending therethrough;
    a thermally representative material configured to represent mammalian tissue and positioned within the thermal cavity; and
    a device extending through the aperture and into the thermally representative material within the thermal cavity, wherein the device is configured to measure a property of the thermally representative material.

2. The assembly of claim 1, wherein the device is a thermocouple configured to measure temperature of the thermally representative material.

3. The assembly of claim 1, wherein the cap is a first cap, the aperture is a first aperture, and the opening is a first opening, wherein the cover portion further comprises a second opening, and wherein the assembly further comprises a second cap extending across the second opening of the cover portion and configured to further enclose the thermal cavity.

4. The assembly of claim 3, wherein the device is a first device, wherein the assembly further comprises a second device extending through the second aperture and into the thermally representative material within the thermal cavity, and wherein the device is configured to measure a property of the thermally representative material.

5. The assembly of claim 4, wherein the first and second devices are first and second thermocouples configured to measure temperatures of the thermally representative material.

6. The assembly of claim 3, further comprising a structural member extending between the first cap and the second cap, wherein the structural member is configured to arrange the first and second caps at a fixed distance apart.

7. The assembly of claim 1, wherein the thermally representative material comprises an ultrasound gel.

8. The assembly of claim 1, wherein the cover portion is formed from a material comprising a mixture of silicone and graphite.

9. The assembly of claim 8, wherein the mixture comprises a ratio of about 95% Shore 25A silicone elastomer and a ratio of about 5% graphite.

10. The assembly of claim 1, wherein the cover portion is an upper cover portion and wherein the assembly further comprises:
    a lower cover portion partially enclosing a second thermal cavity having the thermally representative material therein, the lower cover portion having a lower cover opening;
    a mid cover portion operably coupled between and separating the upper cover portion and the lower cover portion;
    a second cap extending across the lower cover opening and configured to further enclose the second thermal cavity, the second cap having a second aperture extending therethrough; and
    a second device extending through the second aperture and into the thermally representative material within the second thermal cavity, wherein the second device is configured to measure a property of the thermally representative material within the second thermal cavity.

11. A thermally representative phantom mammalian manikin leg limb assembly, comprising:
    an upper cover portion partially enclosing an upper thermal cavity having a first thermally representative material configured to represent mammalian tissue therein, the upper cover portion having a first upper opening;
    a first upper cap extending across the first upper opening and configured to further enclose the upper thermal cavity, the first upper cap having a first upper aperture extending therethrough;
    a first device extending through the first upper aperture and into the upper thermally representative material;
    a mid cover portion operably coupled to the upper cover portion;
    a lower cover portion operably coupled to the mid cover portion opposite the upper cover portion, the lower cover portion partially enclosing a lower thermal cavity having a second thermally representative material configured to represent mammalian tissue therein, the lower cover portion having a first lower opening;
    a first lower cap extending across the first lower opening and configured to further enclose the lower thermal cavity, the first lower cap having a first lower aperture extending therethrough; and
    a second device extending through the first lower aperture and into the second thermally representative material,
    wherein the first device is configured to measure a property of the first thermally representative material, and wherein the second device is configured to measure a property of the second thermally representative material.

12. The assembly of claim 11, wherein the first and second devices are thermocouples, wherein the property of the first thermally representative material is a first temperature, and wherein the property of the second thermally representative material is a second temperature.

13. The assembly of claim 11, wherein:
    the upper cover portion further comprises a second upper opening and the assembly further comprises a second upper cap extending across the second upper opening configured to further enclose the upper thermal cavity; and
    the lower cover portion further comprises a second lower opening and the assembly further comprises a second lower cap extending across the second lower opening configured to further enclose the lower thermal cavity.

14. The assembly of claim 13, wherein:
the assembly further comprises a third device extending through a second upper aperture of the second upper cap and into the first thermally representative material within the upper thermal cavity, the third device being configured to measure a second property of the first thermally representative material; and
the assembly further comprises a fourth device extending through a second lower aperture of the second lower cap and into the second thermally representative material within the lower thermal cavity, the fourth device being configured to measure a second property of the second thermally representative material.

15. The assembly of claim 14, wherein the third and fourth devices are thermocouples configured to measure temperatures of the first and second thermally representative materials, respectively.

16. The assembly of claim 13, further comprising:
a first structural member extending between the first upper cap and the second upper cap, wherein the first structural member is configured to arrange the first and second upper caps at a fixed distance apart; and
a second structural member extending between the first lower cap and the second lower cap, wherein the second structural member is configured to arrange the first and second lower caps at a fixed distance apart.

17. The assembly of claim 11, wherein the first and second thermally representative materials comprises an ultrasound gel.

18. The assembly of claim 17, wherein the ultrasound gel has a specific gravity of 1.02.

19. The assembly of claim 11, wherein the upper cover portion and the lower cover portion are formed from a material having a mixture comprising a ratio of about 95% Shore 25A silicone elastomer and a ratio of about 5% graphite.

20. The assembly of claim 11, wherein the mid cover portion arranges the upper cover portion and the lower cover portion at a fixed distance apart.

21. A method of thermally testing a mammalian heat transfer device, the method comprising:
obtaining a thermally representative phantom mammalian manikin assembly, comprising:
a cover portion at least partially enclosing a thermal cavity and having an aperture extending therethrough;
a thermally representative material configured to represent mammalian tissue and positioned within the thermal cavity; and
a thermocouple extending through the aperture and into the thermally representative material within the thermal cavity, wherein the thermocouple is configured to measure a temperature of a portion of the thermally representative material;
changing the thermal energy of the thermally representative phantom mammalian manikin assembly; and
measuring the change in temperature of the portion of the thermally representative material.

* * * * *